(12) United States Patent
Shike (10) Patent No.: US 7,870,165 B2
(45) Date of Patent: Jan. 11, 2011

(54) ELECTRONIC APPARATUS HAVING DATA PLAYBACK FUNCTION, DATABASE CREATION METHOD FOR THE APPARATUS, AND DATABASE CREATION PROGRAM

(75) Inventor: Akihiro Shike, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 487 days.

(21) Appl. No.: 11/832,373

(22) Filed: Aug. 1, 2007

(65) Prior Publication Data

US 2008/0077550 A1    Mar. 27, 2008

(30) Foreign Application Priority Data

Sep. 27, 2006   (JP) .............................. 2006-262193

(51) Int. Cl.
  *G06F 7/00*    (2006.01)
(52) U.S. Cl. ........................................ 707/803; 707/804
(58) Field of Classification Search ........................ None
  See application file for complete search history.

(56) References Cited

U.S. PATENT DOCUMENTS 7,110,755 B2    9/2006   Shibasaki et al.
2003/0093422 A1    5/2003   Yamamoto et al.
2006/0233521 A1*    10/2006   Takeda .......................... 386/95
2008/0077550 A1*    3/2008   Shike ............................ 707/1

FOREIGN PATENT DOCUMENTS

JP    2003-132063    5/2003

* cited by examiner

*Primary Examiner*—Charles Rones
*Assistant Examiner*—Belix M Ortiz
(74) *Attorney, Agent, or Firm*—Brinks Hofer Gilson & Lione (57) ABSTRACT

An electronic apparatus having a data playback function may include a display; a connection unit through which the electronic apparatus is connected to an external medium storing data that can be played back; a database creation unit that extracts retrieval information used for retrieving the data stored in the external medium from the external medium in response to the connection of the external medium to create a temporary database on the basis of the extracted retrieval information; and a display unit that displays the content of the temporary database in the display.

15 Claims, 8 Drawing Sheets

| ID | FILE PATH | ARTIST | ALBUM | TITLE | GENRE |
|---|---|---|---|---|---|
| 1 | C:/Art-01/Alb-01/Tit-01.mp3 | Art-01 | Alb-01 | Tit-01 | |
| 2 | C:/Art-01/Alb-01/Tit-02.mp3 | Art-01 | Alb-01 | Tit-02 | |
| 3 | C:/Art-02/Alb-02/Tit-01.mp3 | Art-02 | Alb-02 | Tit-11 | |
| 4 | C:/Art-02/Alb-02/Tit-02.mp3 | Art-02 | Alb-02 | Tit-12 | |
| | − − − − − − − − − | − − − | − − − | − − − | |
| n | C:/Art-nn/Alb-nn/Tit-n2.mp3 | Art-nn | Alb-nn | Tit-n2 | |

| ID | FILE PATH | ARTIST | ALBUM | TITLE | GENRE |
|---|---|---|---|---|---|
| 1 | C:/Art-01/Alb-01/Tit-01.mp3 | Art-01 | Alb-01 | Tit-01 | J-POP |
| 2 | C:/Art-01/Alb-01/Tit-02.mp3 | Art-01 | Alb-01 | Tit-02 | J-POP |
| 3 | C:/Art-02/Alb-02/Tit-01.mp3 | Art-02 | Alb-02 | Tit-11 | ROCK |
| 4 | C:/Art-02/Alb-02/Tit-02.mp3 | Art-02 | Alb-02 | Tit-12 | ROCK |
| | --------- | --- | --- | --- | --- |
| n | C:/Art-nn/Alb-nn/Tit-n2.mp3 | Art-nn | Alb-nn | Tit-n2 | R&B |

| ID | FILE PATH | ALBUM | ARTIST | TITLE | GENRE |
|---|---|---|---|---|---|
| 1 | C:/Alb-01/Art-01/Tit-01.mp3 | Alb-01 | Art-01 | Tit-01 | |
| 2 | C:/Alb-01/Art-01/Tit-02.mp3 | Alb-01 | Art-01 | Tit-02 | |
| 3 | C:/Alb-02/Art-02/Tit-01.mp3 | Alb-02 | Art-02 | Tit-11 | |
| 4 | C:/Alb-02/Art-02/Tit-02.mp3 | Alb-02 | Art-02 | Tit-12 | |
| | - - - - - - - - - - | - - - | - - - | - - - | |
| n | C:/Alb-nn/Art-nn/Tit-n2.mp3 | Alb-nn | Art-nn | Tit-n2 | |

FIG. 11

| TYPES OF DATABASES | CREATION TIME (SEC) |
|---|---|
| NORMAL DATABASE | 44 |
| TEMPORARY DATABASE 1 | 6 |
| TEMPORARY DATABASE 2 | 10 |

FIG. 12

ELECTRONIC APPARATUS HAVING DATA PLAYBACK FUNCTION, DATABASE CREATION METHOD FOR THE APPARATUS, AND DATABASE CREATION PROGRAM

RELATED APPLICATIONS

The present application claims priority to Japanese Patent Application Serial Number 2006-262193, filed Sep. 27, 2006, the entirety of which is hereby incorporated by reference.

BACKGROUND OF THE INVENTION

1. Field of the Invention

The present invention relates to an electronic apparatus having a data playback function and, more particularly, to a database creation method for the electronic apparatus with a portable media device connected thereto.

2. Description of the Related Art

In-vehicle audio apparatuses have functions of playing back data stored in, for example, compact discs (CDs) or digital versatile disks (DVDs) and also have functions of playing back, for example, music data or video data stored in portable media devices connected to the in-vehicle audio apparatuses. The storage capacities of such portable media devices are steadily increasing and the number of pieces of the music data stored in the portable media devices sometimes increases into the thousands. Accordingly, it is necessary to create databases of the music data in the portable media devices in order to retrieve the music data.

With regard to a database of data stored in a portable media device, for example, Japanese Unexamined Patent Application Publication No. 2003-132063 discloses an information processing apparatus capable of automatically creating a database of content data distributed among multiple playback apparatuses so that the content data stored in a certain playback apparatus can be shared among the other playback apparatuses.

Since portable media devices storing, for example, music data generally provide only file systems, it is necessary for in-vehicle audio apparatuses to directly operate the files and folders in the portable media devices. Accordingly, in order to retrieve music data stored in the portable media devices, the in-vehicle audio apparatuses should confirm the files in the portable media devices in advance one by one to create and hold a database of the music data stored in the portable media device. A database is created in the following manner in related art.

First, an in-vehicle audio apparatus analyzes the file system of a portable media device connected to the in-vehicle audio apparatus to collect folder and/or file information. Next, the in-vehicle audio apparatus extracts tag information (detailed information) from music data in all the files and registers the tag information in a database. The tag information includes artist names, album names, music names, and so on, which are available as retrieval information used in retrieval of the music data. The in-vehicle audio apparatus reads out the tag information included in each piece of the music data to create the database and to display the music data stored in the portable media device in a display on the basis of the database. A user of the in-vehicle audio apparatus selects a desired music data from the music data displayed in the display. The in-vehicle audio apparatus reads out the music data selected by the user from the portable media device to play back the readout music data.

However, it takes a long time to create the database with the increasing number of the pieces of the music data stored in the portable media device. Accordingly, there is a problem in that the user can search for a desired music data only after the creation of the database is completed after connection of the portable media device was recognized.

SUMMARY OF THE INVENTION

Accordingly, it is an object of the present invention to provide an electronic apparatus capable of creating a database of data included in an external medium connected to the electronic apparatus to more quickly retrieve the data in the database, a database creation method for the electronic apparatus, and a database creation program.

According to an embodiment of the present invention, an electronic apparatus having a data playback function may include a display; a connection unit through which the electronic apparatus is connected to an external medium storing data that can be played back; a database creation unit that extracts retrieval information used for retrieving the data stored in the external medium from the external medium in response to the connection of the external medium to create a temporary database on the basis of the extracted retrieval information; and a display unit that displays the content of the temporary database in the display.

The retrieval information is preferably extracted from a hierarchical structure of the data stored in the external medium. The retrieval information is preferably extracted from file names or folder names in the hierarchical structure. The retrieval information preferably includes any of artist names, album names, and titles indicated in audio data. The temporary database preferably includes items corresponding to the hierarchical levels in the hierarchical structure.

The database creation unit may refer to certain data stored in the external medium, may extract retrieval information that has not been extracted from the hierarchical structure from the certain data, and may register the extracted retrieval information in the temporary database. After the temporary database is created, the database creation unit may extract the retrieval information from each piece of the data stored in the external medium and may create a normal database on the basis of the extracted retrieval information.

The electronic apparatus preferably further includes an input unit and a changing unit that changes the content of the temporary database in response to an input with the input unit. The electronic apparatus preferably further includes a data retrieval unit that retrieves the data stored in the external medium on the basis of the temporary database in response to the input with the input unit.

According to another embodiment of the present invention, a method or program of creating a database of data that can be played back and that is stored in an external medium includes the steps of connecting the external medium to an electronic apparatus having a playback function; extracting retrieval information used for retrieving the data stored in the external medium from the external medium in response to the connection of the external medium; and creating a temporary database on the basis of the extracted retrieval information.

As discussed in more detail below, because the temporary database of the data stored in the external medium is created, it is possible to reduce the creation time of the database, compared with methods in related art. Accordingly, a user can search for data in a short time after the external medium is connected.

DESCRIPTION OF THE PREFERRED EMBODIMENTS

An in-vehicle audio playback apparatus may be used as an electronic apparatus according to an embodiment of the present invention. The in-vehicle audio playback apparatus may have a function of playing back audio data stored in a portable media device connected to the in-vehicle audio playback apparatus. The portable media device is, for example, a disk drive device such as a semiconductor memory, a CD, or a DVD, a hard disk drive, or another storage medium, which stores the audio data the in-vehicle audio playback apparatus can play back. The audio data may be compressed in a format, such as Moving Picture Experts Group Audio Layer 3 (MP3) or Windows Media Audio (WMA). The portable media device need not have the playback function, may only store audio data, and may supply the stored audio data. Alternatively, the portable media device may have the function of playing back audio data. Furthermore, the portable media device may have a database of audio data. In such a case, the database is created in the format of the in-vehicle audio playback apparatus. In the following description, it is assumed that a universal serial bus (USB) memory having a USB terminal is used as the portable media device and the USB memory is connected to the in-vehicle audio playback apparatus.

Figure 1:
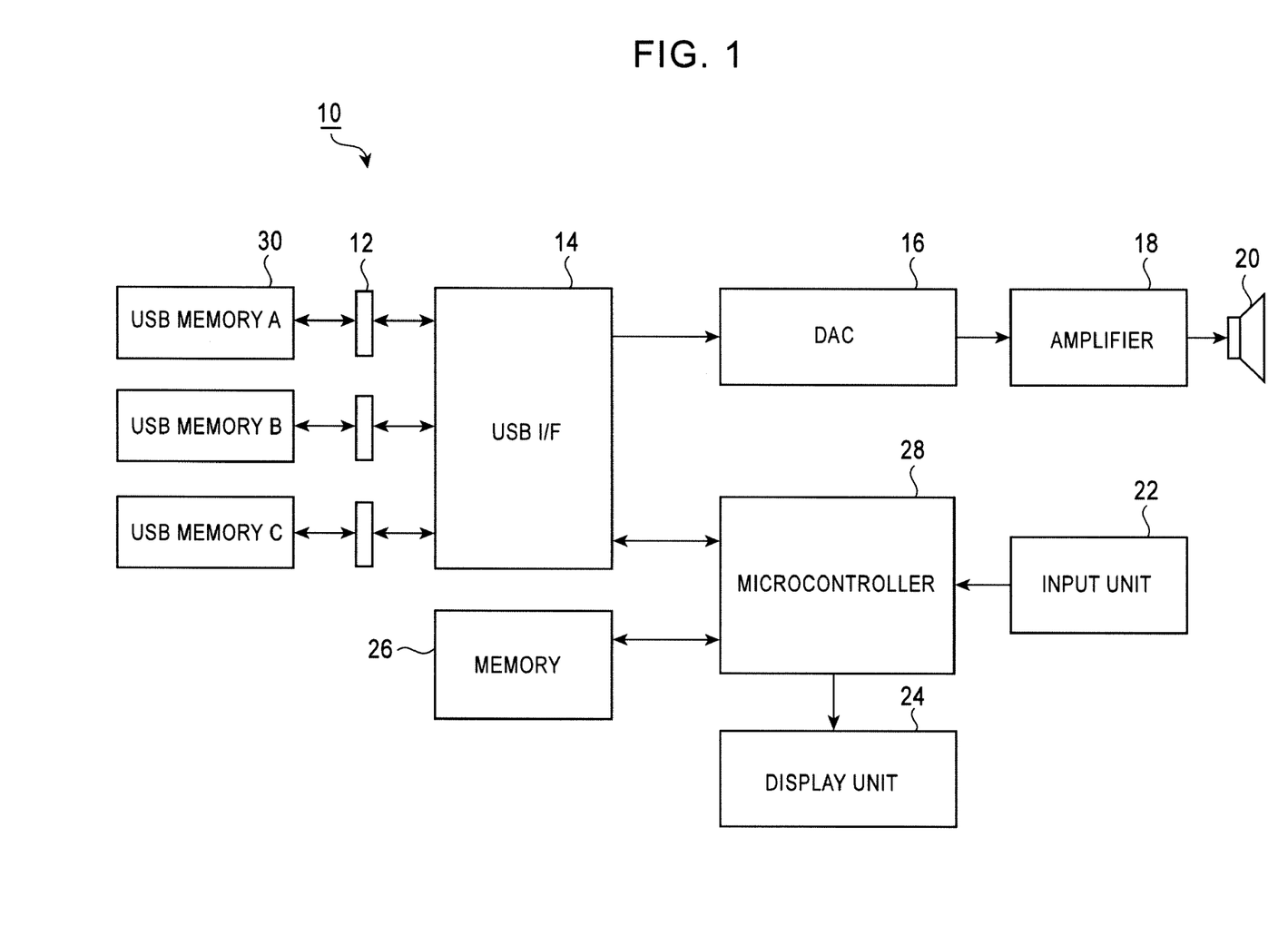
FIG. 1 is a block diagram showing an embodiment of a configuration of an audio playback apparatus.

FIG. 1 is a block diagram showing one embodiment of a configuration of an audio playback apparatus 10. The audio playback apparatus 10 may include USB connectors 12, a USB interface (I/F) 14, a digital analog converter (DAC) 16, an amplifier 18, a speaker 20, an input unit 22, a display unit 24, a memory 26, and a microcontroller 28. The USB connectors 12 are used for connection to multiple USB memories A to C 30. The USB I/F 14 is connected to the USB connectors 12. The DAC 16 converts a digital audio signal read out from the USB memories A to C 30 into an analog audio signal. The amplifier 18 amplifies the analog audio signal. The speaker 20 converts the amplified audio signal into an audible sound. The input unit 22 includes a touch panel and a remote controller and receives an input from a user. The display unit 24 displays, for example, a database of the audio data stored in the USB memories A to C 30. The memory 26 temporarily stores the data read out from the USB memories A to C 30 and the database. The microcontroller 28 controls each component in the audio playback apparatus 10.

The microcontroller 28 has a function of automatically creating the database of the audio data stored in the USB memories A to C 30 in response to recognition of the connection of the USB memories A to C 30 in accordance with programs stored in a random access memory (RAM) or a read only memory (ROM) in the microcontroller 28. The content of the created database is displayed in the display unit 24 and the user searches for desired audio data from the audio data displayed in the display unit 24.

Figure 2:
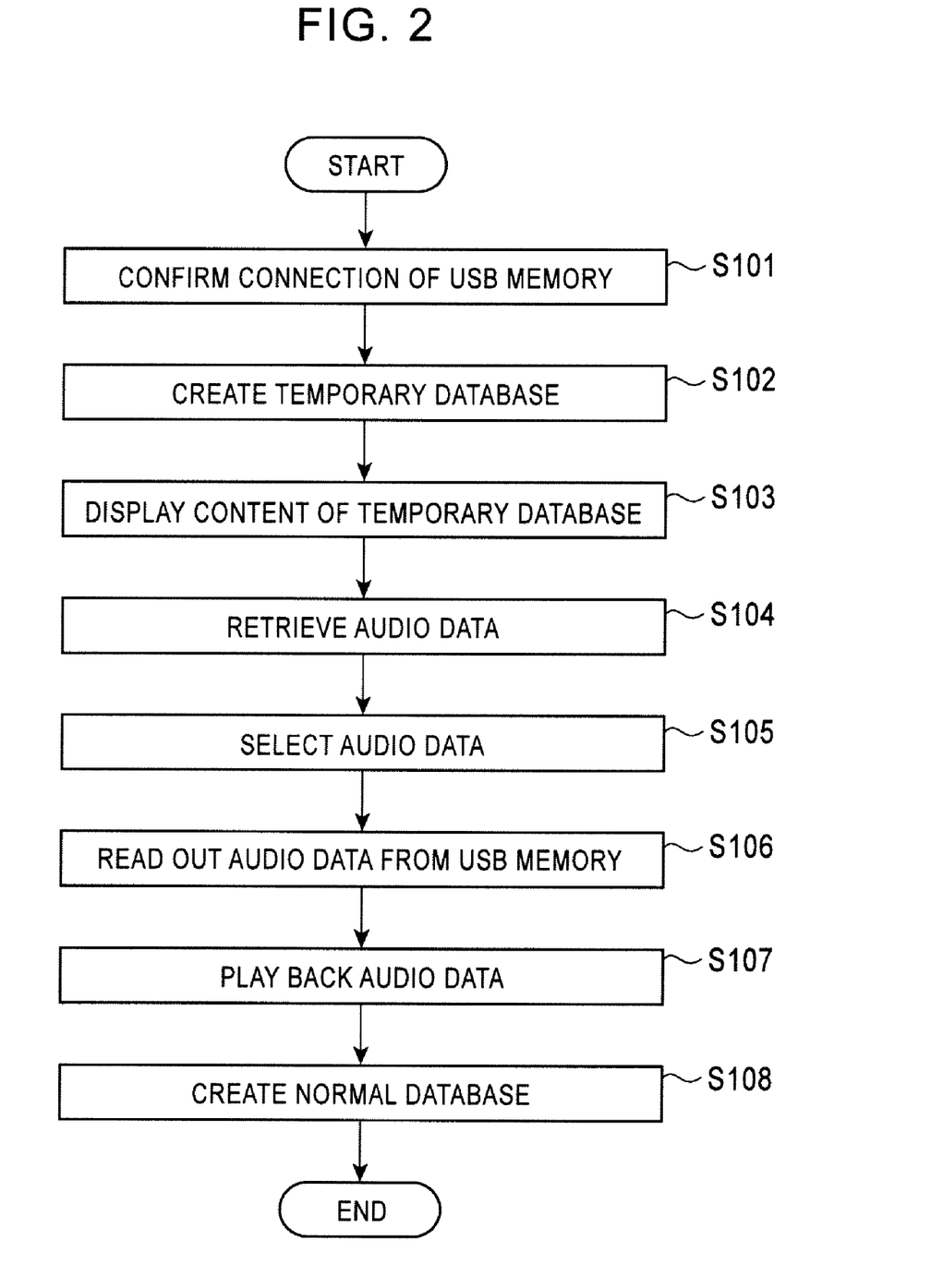
FIG. 2 is a flowchart showing an embodiment of a method of creating a database for an audio playback apparatus.

FIG. 2 is a flowchart showing one embodiment of a method of creating a database for the audio playback apparatus 10. After the USB memories A to C 30 storing audio data is connected to the audio playback apparatus 10, in Step S201, the microcontroller 28 recognizes the connection of the USB memories A to C 30. In Step S102, the microcontroller 28 creates a temporary database of audio data stored in the USB memories A to C 30. The creation of the temporary database will be described in more detail below. In Step S103, the microcontroller 28 stores the created temporary database in the memory 26 and displays the content of the temporary database in the display unit 24. Although the display manner is not particularly restricted, the microcontroller 28 hierarchically, for example, alphabetically displays necessary items included in the temporary database in the display unit 24. Multiple items may be simultaneously displayed in the display unit 24 with a scrolling function.

In Step S104, a user refers to the content of the temporary database displayed in the display unit 24 to search for the audio data stored in the USB memories A to C 30. Although the search method is not particularly restricted, the user may hierarchically refine the search of the items displayed in the display unit 24 or may input a keyword to search for an item matching with the input keyword. In Step S105, the user selects desired audio data. In Step S106, the microcontroller 28 reads out the corresponding audio data from the USB memories A to C 30 on the basis of the temporary database. In Step S107, the microcontroller 28 plays back the readout audio data.

In Step S108, the microcontroller 28 creates a normal database of the audio data stored in the USB memories A to C 30 in the background while the audio data is playing back. The normal database is created after the creation of the temporary database and need not necessarily be created during the playback of the audio data.

In the creation of the normal database, the microcontroller 28 analyzes the file systems of the USB memories A to C 30, collects folder/file information from the file system, and reads out tag information from the audio data stored in all the file systems. The tag information includes artist names, album names, music names, genres, performance times, and so on, which are available as information concerning the audio data. The microcontroller 28 creates the normal database on the basis of the readout tag information and replaces or updates the temporary database with or to the normal database.

When the multiple USB memories 30 are connected to the audio playback apparatus 10, all the USB memories 30 are sequentially analyzed to create the temporary databases and the normal databases.

Figure 3:
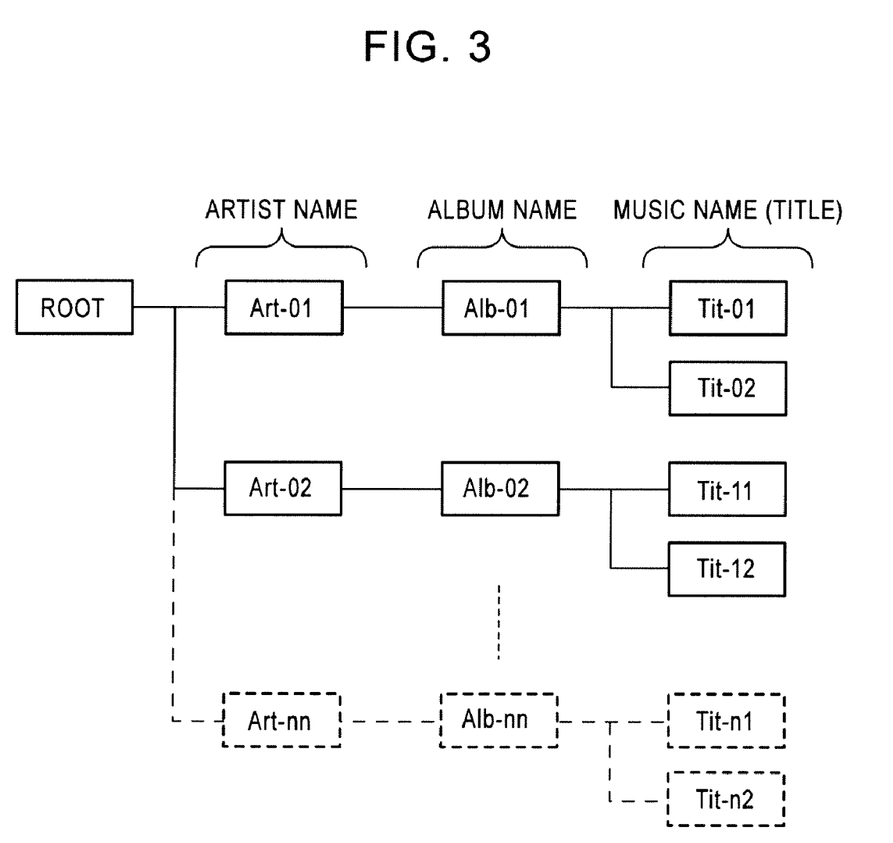
FIG. 3 illustrates an example of a file system of audio data stored in a USB memory.
Figure 4:
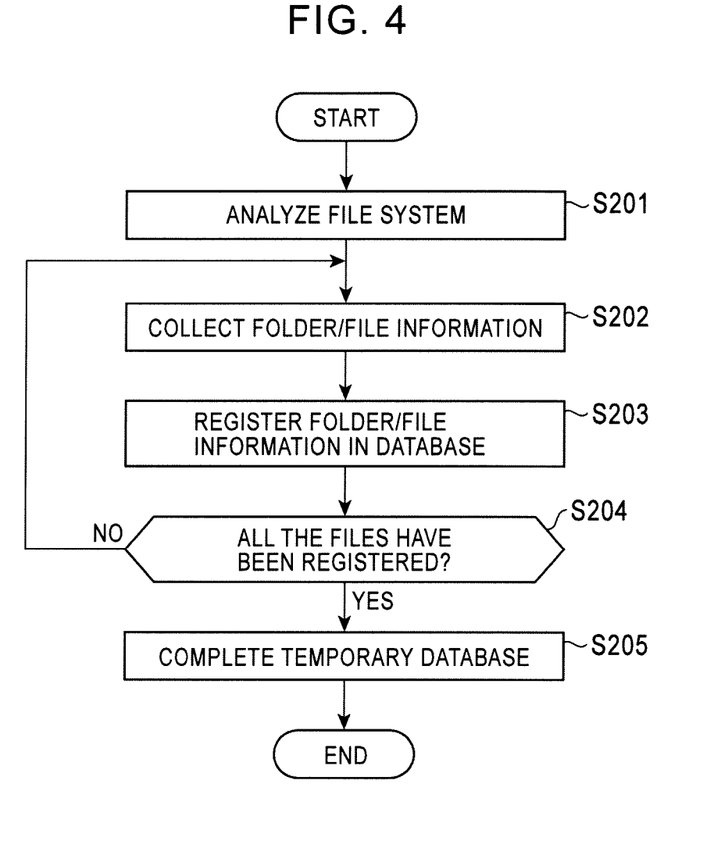
FIG. 4 is a flowchart showing an embodiment of a process of creating a temporary database.

A first method of creating a temporary database will now be described with reference to FIGS. 3 and 4. FIG. 3 illustrates an example of the file system of audio data stored in a USB memory. FIG. 4 is a flowchart showing an example of a process of creating a temporary database.

Generally, in order to store much more data and efficiently manage the data, the data is stored in files in a hierarchical structure or in a tree structure. For example, as shown in FIG. 3, artist names (Art-01, Art-02, ..., and Art-nn) are created as folder names, album names (Alb-01, Alb-02, ..., and Alb-nn) are created as folder names under the artist names, music names (Tit-01, Tit-02, Tit-11, Tit-12, ... Tit-n1, and Tit-n2) are created as file names under the album names, and the audio data is stored in each file in the lowest hierarchical level.

When the audio data is stored in such a file system, the temporary database is created in the process shown in FIG. 4. In Step S201, the microcontroller 28 analyzes the file systems of the USB memories 30 connected to the audio playback apparatus 10. In Step S202, the microcontroller 28 collects folder/file information in the hierarchical structure. The microcontroller 28 collects information concerning paths from the root of the USB memory 30 to the folder or files in each hierarchical level, the folder names, and the files names in Step S202. For example, if each of the USB memories 30 has the file system shown in FIG. 3, the microcontroller 28 extracts the artist names, which are top-level folder names next to the root, the album names, which are folder names under the artist names, and the title names, which are file names under the album names. Files having hierarchical levels formed thereunder are defined as folders.

In Step S203, the microcontroller 28 registers the collected folder and file information in a temporary database. The temporary database reflects the file system of the USB memory 30. The temporary database has the content shown in FIG. 5 in the case of the file system shown in FIG. 3. The temporary database includes items indicating identification (ID) information, file paths, artist names, album names, and titles. The microcontroller 28 extracts information in each item from the hierarchical structure of the USB memory 30 and from the folder and file names in the hierarchical structure. However, since genre information cannot be extracted from the hierarchical structure, items corresponding to the genre information are blank.

Figure 12:
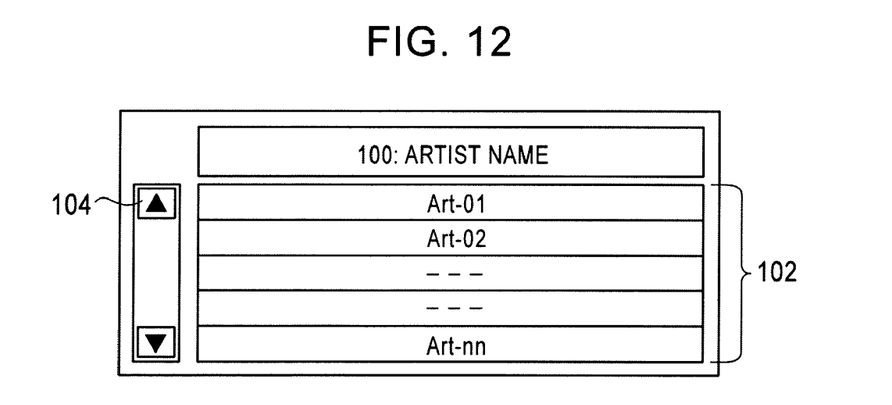
FIG. 12 shows an example of the displayed content of the temporary database.

The microcontroller 28 continues to collect the file/folder information until all the files in the USB memory 30 have been registered. In Step S204, the microcontroller 28 determines whether all the files in the USB memory 30 have been registered. If the microcontroller 28 determines that all the files in the USB memory 30 have not been registered, the microcontroller 28 goes back to Step S202. If the microcontroller 28 determines that all the files in the USB memory 30 have been registered, then in Step S205, the microcontroller 28 completes the temporary database. The completed temporary database is displayed in the display unit 24 to provide the audio data to be played back. For example, as shown in FIG. 12, multiple items 102 indicating top-level artist names are listed in the display unit 24. When the number of items 102 is too large to be displayed in the screen, a scroll button 104 is used to scroll the items. When a user selects a desired artist name, the album names under the artist name are listed. When the user selects a desired album name, the titles under the album name are listed. After the user selects a title, the audio data in the path of the selected title is read out from the USB memory 30 and the audio data is played back.

Since the genre information is not registered in the temporary database (refer to FIG. 5), it is not possible to retrieve genres. One genre is generally allocated to each album. Accordingly, if the genre information is necessary, only one file in each folder is analyzed to acquire the genre information. FIG. 6 is a flowchart showing an example of a process of creating a temporary database to which the genre information is added. Steps S301 to S304 in FIG. 6 are the same as Steps S201 to S204 in FIG. 4.

After the temporary database that does not include the genre information is created, in Step S305, the microcontroller 28 reads out the audio data from only one file for every folder to extract the genre information from the tag information included in the audio data. For example, in the file system shown in FIG. 3, the microcontroller 28 reads out the tag information included in the audio data in one file under the album Alb-01 to extract the genre information about the album Alb-01 from the tag information.

Figure 6:
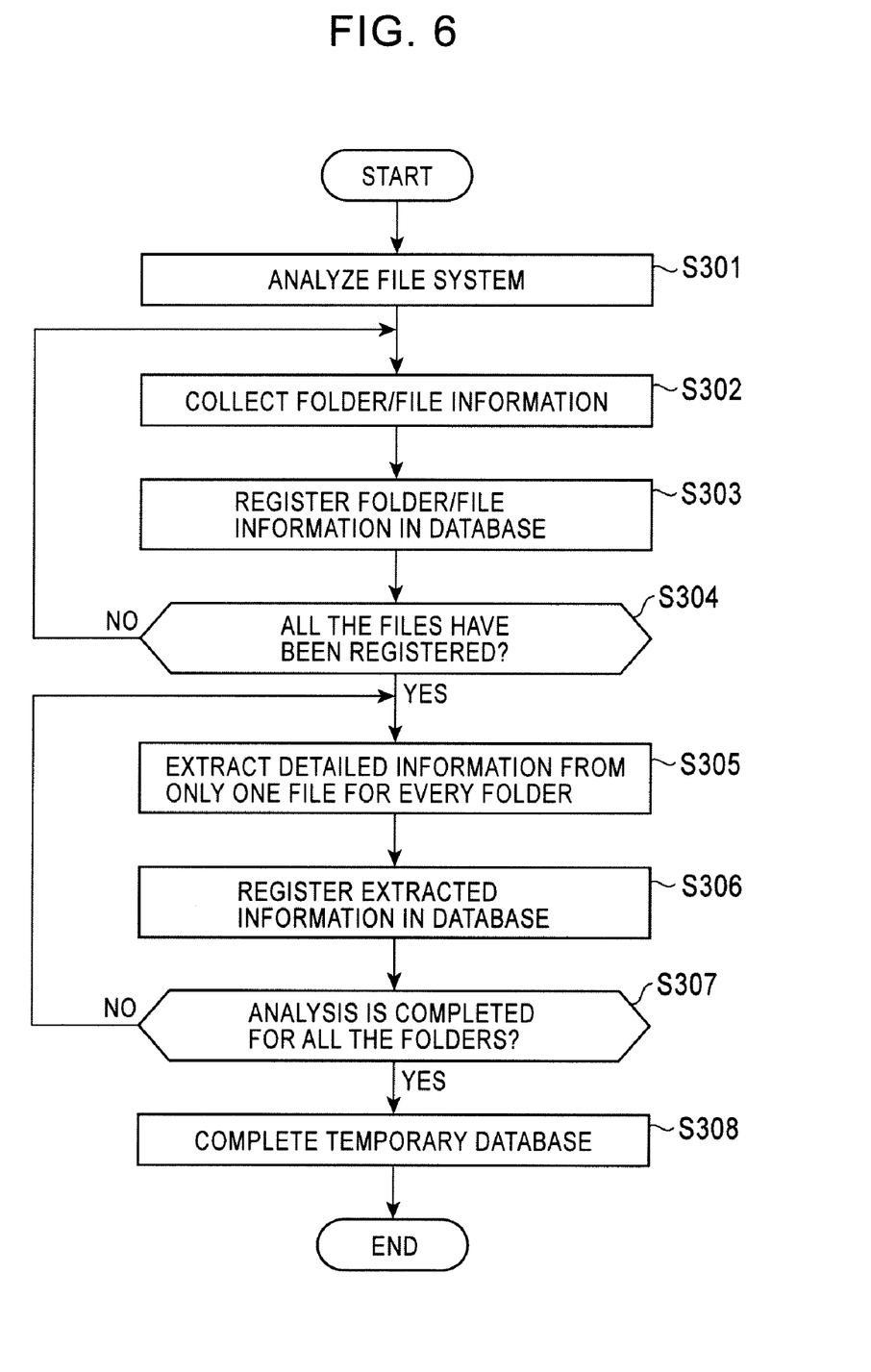
FIG. 6 is a flowchart showing another embodiment of the process of creating a temporary database.
Figure 7:
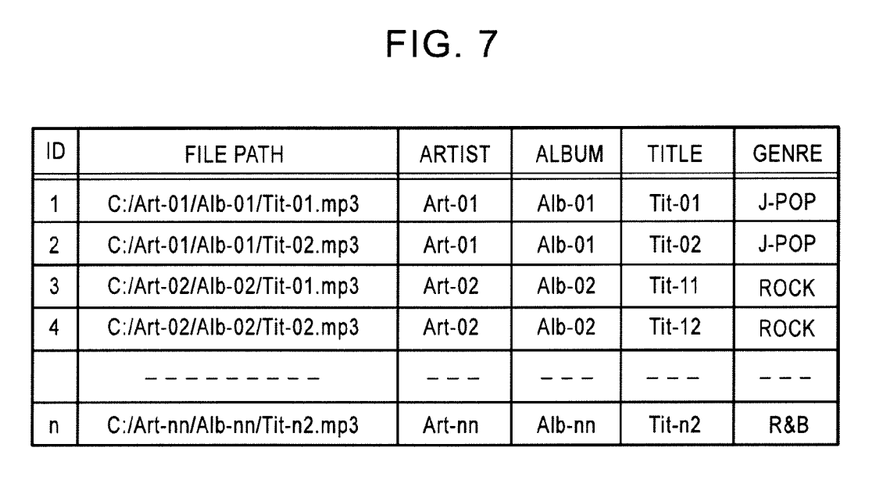
FIG. 7 shows an example of the content of the temporary database created in the process shown in FIG. 6.

In Step S306, the microcontroller 28 registers the extracted genre information in the corresponding item in the temporary database. The microcontroller 28 analyzes one file for every folder indicating an album name. In Step S307, the microcontroller 28 determines whether the analysis is completed for all the folders. If the microcontroller 28 determines that the analysis is not completed for all the folders, the microcontroller 28 goes back to Step S305. If the microcontroller 28 determines that the analysis is completed for all the folders, then in Step S308, the microcontroller 28 completes the genre information in the temporary database. FIG. 7 illustrates an example of the content of the completed temporary database in which the genre information for every album is registered. The user can search for the audio data with reference to the genre information.

Figure 8:
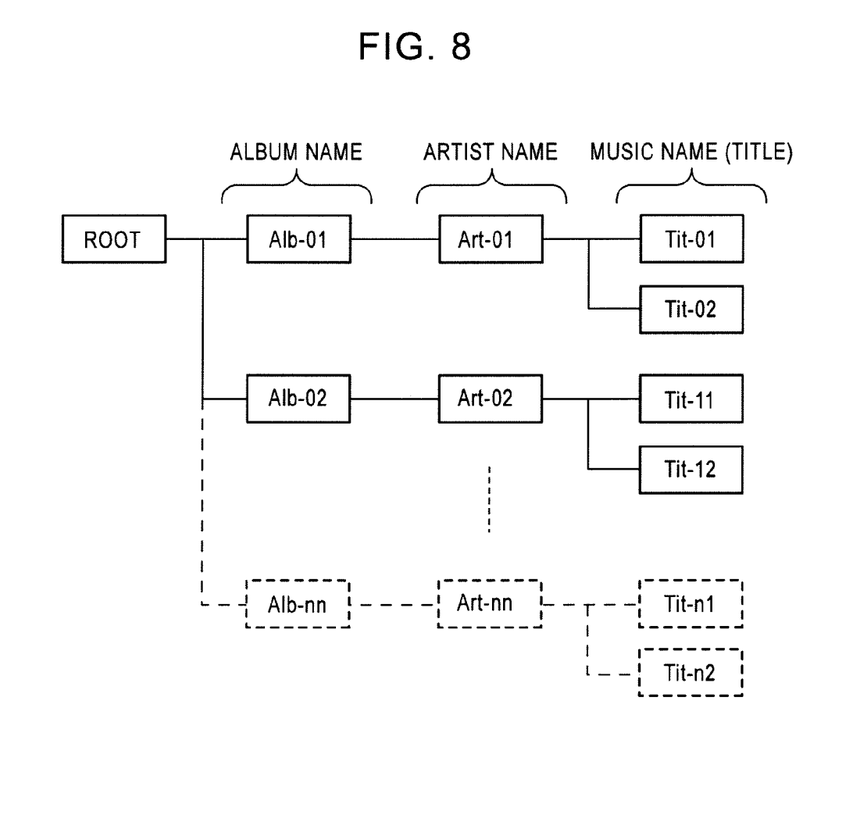
FIG. 8 illustrates another example of the file system of the audio data stored in the USB memory.

A second method of creating a temporary database will now be described. Although the first method of creating a database is based on the file system shown in FIG. 3, the audio data can be stored in a hierarchical structure different from the file system shown in FIG. 3. With the second method of creating a database, it is possible to flexibly create a temporary database by using a user interface even when the audio data is stored in a hierarchical structure different from the file system shown in FIG. 3. For example, it is assumed that the hierarchical structure includes album names, artist names, and title names in this order, as shown in FIG. 8.

Figure 9:
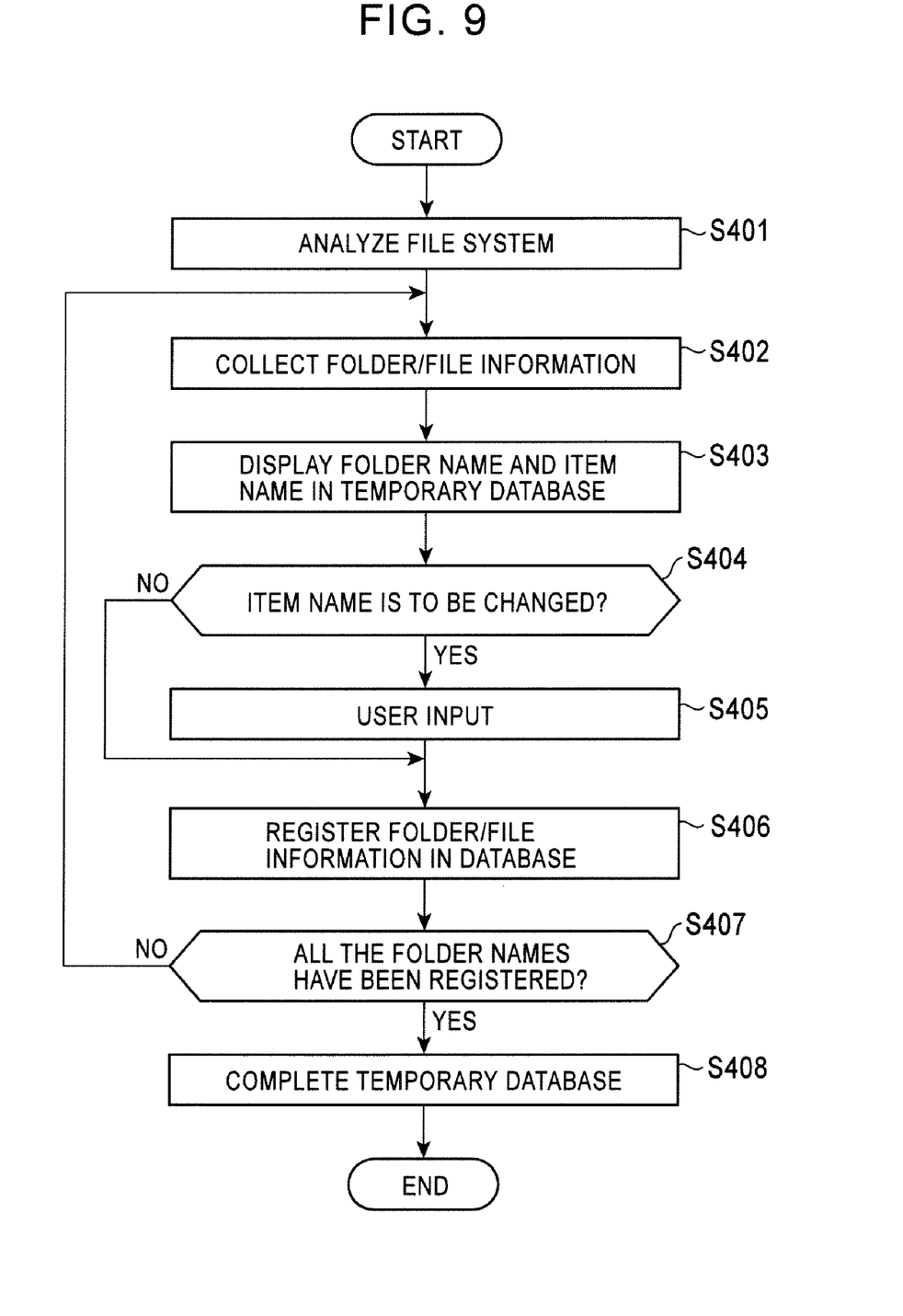
FIG. 9 is a flowchart showing another embodiment of a process of creating a temporary database.

FIG. 9 is a flowchart showing an example of a process of creating a temporary database. In Step S401, the microcontroller 28 analyzes the file system of the USB memory 30. In Step S402, the microcontroller 28 collects folder/file information.

In Step S403, the microcontroller 28 displays the top-level folder name in the hierarchical structure and the item name in the temporary database corresponding to the folder name in the display unit 24. For example, in the hierarchical structure shown in FIG. 8, an album name is displayed as the top-level folder name and an artist name is displayed as the item name in the temporary database.

In Step S404, a user refers to the content of the display in the display unit 24 to determine whether the item in the temporary database matches with the folder name. If the item in the temporary database does not match with the folder name, that is, if the user wants to change the item name in the temporary database, then in Step S405, the user inputs a correct item name, that is, changes the artist name to the album name. Although the user may input the correct item name, it is preferred that a desired item name be selected from multiple candidates defined in advance.

Figure 10:
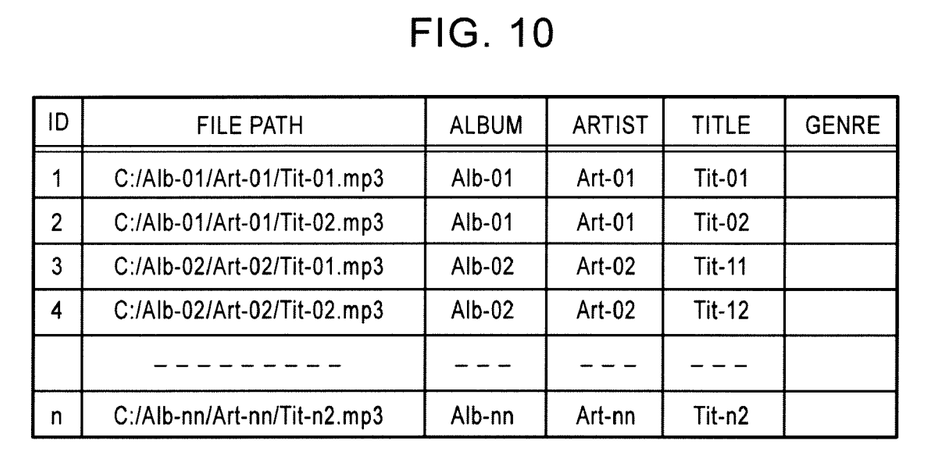
FIG. 10 shows an example of the content of the temporary database created in the process shown in FIG. 9.

In Step S406, the microcontroller 28 associates the folder name extracted or changed in the above manner with the item name in the temporary database and registers the folder name associated with the item name in the temporary database in the temporary database. The microcontroller 28 extracts a folder name in the subsequent hierarchical level in the hierarchical structure to determine whether the extracted folder name matches with the item name in the temporary database. If the microcontroller 28 determines that the extracted folder name matches with the item name in the temporary database, the microcontroller 28 uses the item name. If the microcontroller 28 determines that the extracted folder name does not match with the item name in the temporary database, the microcontroller 28 changes the item name. In Step S407, the microcontroller 28 determines whether all the folder names have been registered. If the microcontroller 28 determines that all the folder names have not been registered, the microcontroller 28 goes back to Step S402. If the microcontroller 28 determines that all the folder names have been registered, then in Step S408, the microcontroller 28 completes the temporary database. In the case of the temporary database corresponding to the file system shown in FIG. 8, the hierarchical level of the artist names is replaced with that of the album names in the structure shown in FIG. 10, compared with the file system shown in FIG. 3.

With the second method of creating a database, it is possible to correctly create the temporary database on the basis of the determination by the user even if the USB memory has a hierarchical structure different from the ordinary hierarchical structure. Although the folder or file names are displayed for every hierarchical level and it is determined whether the displayed folder or file names match with the items in the temporary database, the method is not restricted to the one described above. After creating the temporary database, the microcontroller 28 may display the temporary databases in the display unit 24 and may change the items in the temporary databases in the display unit 24.

According to the embodiments described above, since the file system of the USB memory is analyzed in response to the connection of the USB memory to create the temporary database of the audio data included in the file system, it is possible to create the temporary database used for the data retrieval in a short time.

Figure 5:
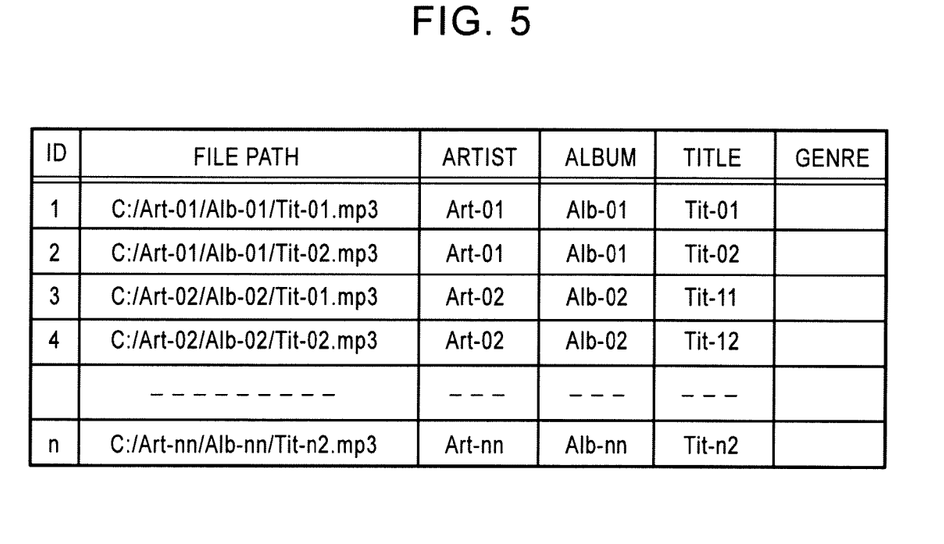
FIG. 5 shows an example of the content of the temporary database created in the process shown in FIG. 4.
Figure 11:
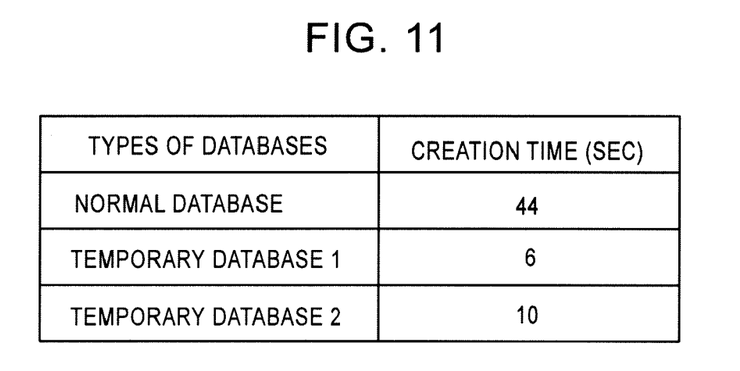
FIG. 11 shows an example of a simulation result of the times necessary to create temporary database and a normal database.

FIG. 11 shows an example of a simulation result of the times necessary to create the temporary database shown in FIG. 5 (called a temporary database 1), the temporary database shown in FIG. 7 (called a temporary database 2), and a normal database. It is assumed that the number of folders is equal to 200, the number of files is equal to 1,000, a hard disk drive is used as the portable media device, and the memory 26 storing the database is a dynamic RAM (DRAM). In the simulation result in FIG. 11, it takes approximately 6 seconds to create the temporary database 1 and approximately 10 seconds to create the temporary database 2. These creation times of the temporary databases are much shorter than the approximate 44 seconds required for the normal database to be created and, therefore, the waiting time for the search can also be reduced.

It should be understood by those skilled in the art that various modifications, combinations, sub-combinations, and alterations may occur depending on design requirements and other factors insofar as they are within the scope of the appended claims or the equivalents thereof.

Although the USB memory is used as the portable media device storing the audio data in the embodiments of the present invention described above, another medium may be used as the portable media device. The USB memories may be connected to the audio playback apparatus by wires or by radio waves. Although the audio data is played back in the embodiments described above, video data or other multimedia data may be played back. In this case, the electronic apparatus has a function of playing back the video data, in addition to the function of playing back the audio data.

Embodiments of the present invention may be used in an electronic apparatus to which a portable media device can be connected and which is capable of playing back video and/or audio data.

It is therefore intended that the foregoing detailed description be regarded as illustrative rather than limiting, and that it be understood that it is the following claims, including all equivalents, that are intended to define the spirit and scope of this invention.

What is claimed is:

1. An electronic apparatus having a data playback function, the electronic apparatus comprising:
    a display;
    a connection unit through which the electronic apparatus is connected to an external medium storing data that is configured to be played back;
    a database creation unit that is configured to extract, in response to the connection of the external medium, retrieval information from a hierarchical structure of the data stored in the external medium for use in retrieving the data stored in the external medium from the external medium to create a temporary database on the basis of the extracted retrieval information, and is configured to, after creating the temporary database, extract retrieval information from each piece of data stored in the external medium and create a normal database that includes information that is not included in the temporary database on the basis of the retrieval information extracted from each piece of data stored in the external medium; and
    a display unit that is configured to display the content of the temporary database in the display and is configured to display the content of the normal database in the display after displaying the contents of the temporary database in the display.

2. The electronic apparatus of claim 1, wherein to create the temporary database, the database creation unit is configured to extract the retrieval information from file names or folder names in the hierarchical structure.

3. The electronic apparatus of claim 2,
    wherein the retrieval information extracted to create the temporary database comprises at least one of artist names, album names, and titles indicated in audio data.

4. The electronic apparatus of claim 3,
    wherein the temporary database comprises items corresponding to the hierarchical levels in the hierarchical structure.

5. The electronic apparatus of claim 4,
    wherein the database creation unit refers to certain data stored in the external medium, extracts retrieval information that has not been extracted from the hierarchical structure from the certain data, and registers the extracted retrieval information in the temporary database.

6. The electronic apparatus of claim 5, further comprising:
    an input unit; and
    a changing unit that changes the content of the temporary database in response to an input with the input unit.

7. The electronic apparatus of claim 6, further comprising:
    a data retrieval unit that retrieves the data stored in the external medium on the basis of the temporary database in response to the input with the input unit.

8. The electronic apparatus of claim 1,
    wherein the external medium does not have a data playback function.

9. A method of creating a database of data that is configured to be played back and that is stored in an external medium, the method comprising the steps of:
    extracting, in response to a connection of the external medium to an electronic apparatus having a playback function, retrieval information from a hierarchical structure of the data stored in the external medium for use in retrieving the data stored in the external medium;

creating a temporary database on the basis of the extracted retrieval information;

after creation of the temporary database, extracting retrieval information from each piece of data stored in the external medium; and creating a normal database that includes information that is not included in the temporary database on the basis of retrieval information extracted from each piece of data stored in the external medium.

10. The method of claim 9, wherein the retrieval information extracted to create the temporary database is extracted from file names or folder names in the hierarchical structure.

11. The method of claim 9, further comprising the step of:

receiving an input used for changing the content of the created temporary database.

12. The method of claim 11, further comprising the step of:

retrieving the data stored in the external medium on the basis of the temporary database in response to the received input.

13. The method of claim 12, further comprising the step of:

displaying the content of the created temporary database in a display of the electronic apparatus.

14. A computer-readable storage medium comprising a set of instructions for creating a database of data that is configured to be played back and that is stored in an external medium, the set of instructions to direct a processor to perform acts of:

extracting, in response to a connection of the external medium to an electronic apparatus having a playback function, retrieval information from a hierarchical structure of the data stored in the external medium for use in retrieving the data stored in the external medium;

creating a temporary database on the basis of the extracted retrieval information;

after creation of the temporary database, extracting retrieval information from each piece of data stored in the external medium; and creating a normal database that includes information that is not included in the temporary database on the basis of retrieval information extracted from each piece of data stored in the external medium.

15. The computer-readable storage medium of claim 14, wherein the retrieval information extracted to create the temporary database is extracted from file names or folder names in a hierarchical structure of the data stored in the external medium.

* * * * *